US008438538B2

(12) United States Patent
Russ

(10) Patent No.: US 8,438,538 B2
(45) Date of Patent: May 7, 2013

(54) SIMPLEBINDING EXTENSION

(75) Inventor: Jonathan B. Russ, Seattle, WA (US)

(73) Assignee: IdentityMine, Inc., Tacoma, WA (US)

( * ) Notice: Subject to any disclaimer, the term of this patent is extended or adjusted under 35 U.S.C. 154(b) by 1685 days.

(21) Appl. No.: 11/740,095

(22) Filed: Apr. 25, 2007

(65) Prior Publication Data
US 2008/0196018 A1 Aug. 14, 2008

Related U.S. Application Data

(60) Provisional application No. 60/888,933, filed on Feb. 8, 2007.

(51) Int. Cl.
*G06F 9/44* (2006.01)
*G06F 9/45* (2006.01)
(52) U.S. Cl.
USPC ............................................. 717/120; 717/143
(58) Field of Classification Search .................. 717/120, 717/121, 107, 143
See application file for complete search history.

(56) References Cited

U.S. PATENT DOCUMENTS
2004/0230911 A1* 11/2004 Bent et al. ...................... 715/762

OTHER PUBLICATIONS

Relyea, R., "3 Coding Styles for Avalon Applications" Apr. 27, 2005, xaml:Blog, 7 pages.*
Himschoot, P., "Amazing XAML", Jul. 28, 2006, MSDN, pp. 1-14.*

* cited by examiner

*Primary Examiner* — Anna Deng
(74) *Attorney, Agent, or Firm* — Steven C. Stewart

(57) ABSTRACT

A SimpleBinding extension in Window Presentation Foundation (WPF) is established using a compact binding syntax in which all binding components are specified in a string. The simple binding string is parsed to derive a native WPF binding class. A typecast may be used to determine how the binding result will be translated from one Common Language Runtime (CLR) type to another. The typecast may be provided with the binding components or derived from properties of the target WPF dependency property.

14 Claims, 3 Drawing Sheets

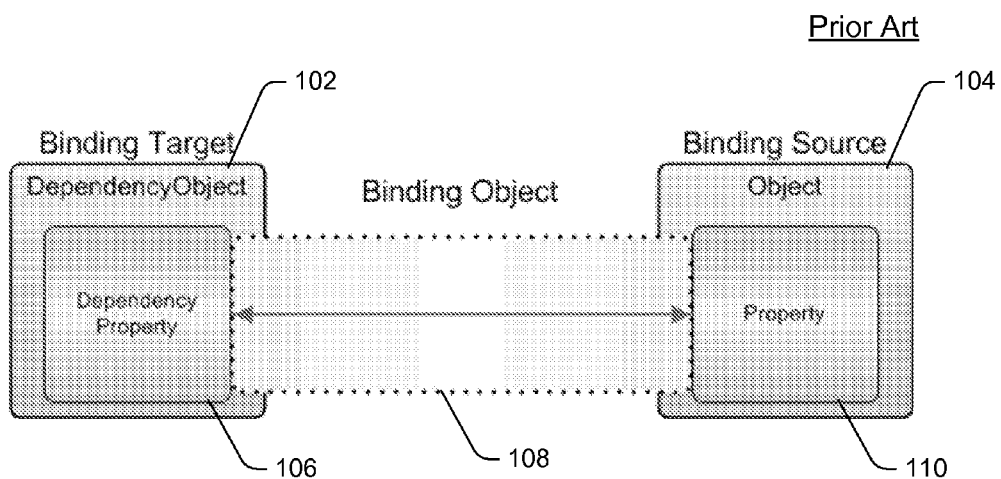

Prior Art

FIG. 1

SPath syntax:

"[(optional typecast) source . property path : optional value converter ]"

SPath Strings:

| | |
|---|---|
| "[RootWindow.CurrentNavigationFrame]" | Explicit – Element Name |
| "[{x:Static md:AppWindow.Instance}.WindowState]" | Explicit – Source |
| "[{Self}.(md:AppWindow.PersonasColumnWidth)]" | Explicit – Relative Source |
| "[{TemplatedParent}.IsMouseOver]" | Explicit – Relative Source |
| "[{FindAncestor ItemsControl, 1}.Tag]" | Explicit – Relative Source |
| "[{DataContext}.SortOrder]" | Implicit – Inherited Data Context |
| "[.Name]" | Implicit – Inherited Data Context |

FIG. 2

SIMPLEBINDING EXTENSION

PRIORITY

This application claims the benefit of U.S. provisional patent application No. 60/888,933 filed Feb. 8, 2007.

BACKGROUND

Windows Presentation Foundation (WPF) is Microsoft's presentation subsystem for .NET 3.0, which is a key part of the Microsoft Windows Vista operating system. In WPF, applications can operate over many types of data, including simple objects, collection objects, WPF elements, XML data, ADO.NET objects, and objects returned from Web services. To facilitate data visualization and interaction, WPF implements a mechanism that allows the declaratively binding of these types of data sources to an application user interface (UI). More information is available online within the Microsoft Developer Network (MSDN) documentation for WPF.

Referring to FIG. 1, a data binding is a formal relationship between a binding source 104 (the data source object) and a binding target 102 (the data consumer) that ensures synchronization between the two.

In WPF, a "binding" object 108 is used to bind the value of a source Property 110 on a source CLR object 104 to a target Dependency Property 106 on a target Dependency Object 102. This is traditionally accomplished by creating an instance of the native binding class (a "class" is also referred to herein as an "extension") and then setting several different properties on the instantiated object. Together, these various properties identify the different components of a binding. The native binding class is an example of a markup extension.

SUMMARY

A SimpleBinding is established using a compact binding syntax in which all binding components are specified in a string. The simple binding string is parsed to derive a native WPF binding object. A typecast may be used to determine how the result will be translated from one Common Language Runtime (CLR) type to another. In one embodiment the binding components are translated while parsing the XAML markup during the WPF application's runtime execution. The typecast may be derived from the SimpleBinding object or from properties of the target WPF dependency property.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 1 is a prior art depiction of a how a Binding source is bound to a Binding Target using a Binding Object in WPF.

FIG. 2 is a textual representation of an SPath syntax and exemplary SPath Strings.

DETAILED DESCRIPTION

Figure 3:
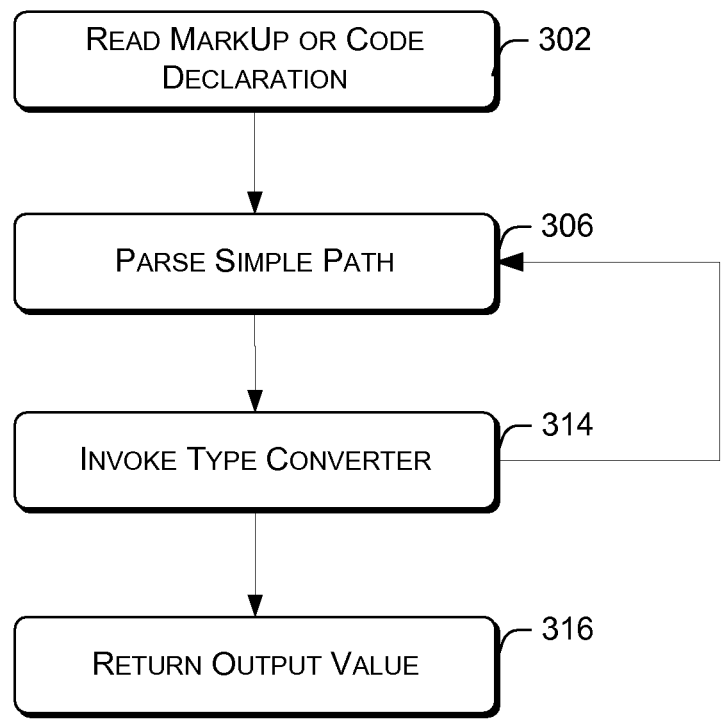
FIG. 3 is a diagram of an exemplary process used to implement a SimpleBinding Markup Extension.

This disclosure relates to a SimpleBinding extension for Microsoft Windows Presentation Foundation (WPF) for use on a computer having memory.

A SimpleBinding markup extension is a markup extension for the WPF extensible Application Markup Language (XAML). The SimpleBinding markup extension uses a single string, called a Simple Path, also referred to herein as an "SPath", an "SPath string", or a "simple binding string", to represent the major components of a traditional WPF Binding. These major components include a source, an inherited source, a relative source, an element name, a property path, and a converter. An optional component, called a typecast, which determines how the binding components will be translated from one Common Language Runtime (CLR) type to another, may be included as part of a SimpleBinding.

An SPath string can be used both in markup and in code to specify the components of a binding as a single, human-readable string. This string is said to follow the "SPath syntax".

In one embodiment, a SimpleBinding markup extension introduces a simplified approach for establishing a binding in WPF using a compact binding syntax in which all binding components are specified in a single, well-defined string. The SimpleBinding class relies on another markup extension called a SimplePath markup extension.

The SimplePath markup extension implements a SimplePath parser which is responsible for breaking an SPath string into its relevant binding components and an additional typecast component.

The SimpleBinding markup extension is derived from the native WPF Binding class and thus represents a true WPF Binding. In other words, the SimpleBinding markup extension is literally derived from the same class. In object oriented programming, every class derives from a base class and then extends the base class by adding functionality. SimpleBinding derives from the Binding class.

This allows the SimpleBinding markup extension to be used in all circumstances where a traditional Binding extension can be used, including non-traditional uses for markup extension classes such as with the Binding property of a DataTrigger class. DataTrigger is a WPF class that allows the result of a binding to be the source of a trigger object.

Deriving the SimpleBinding markup extension directly from the WPF Binding class introduces some restrictions. One of the advantages of a markup extension is its ability to override the ProvideValue method (inherited from the MarkupExtension base class) and leverage its supplied IServiceProvider parameter at runtime to access the XAML parser's context, and hence, XAML parser services like IProvideValueTarget and IXamlTypeResolver.

The base Binding class seals the ProvideValue override. Additionally, the base Binding class designates several key methods as "protected internal" members, making them inaccessible to derived classes like SimpleBinding.

By providing the separate SimplePath markup extension class to parse the SPath string, it is possible to leverage all the power of a true markup extension (e.g., the ability to override the ProvideValue method and access the XAML parser services) while still providing a custom parser for the SimpleBinding components within a SPath string.

The SPath Syntax

The work performed by the SimplePath parser is related to the SPath syntax. An SPath syntax identifies all components of a SimpleBinding markup extension using the format depicted in FIG. 2. In this format, the entire SPath string is enclosed within square brackets ([ ]). The source of the binding is separated from the binding's property path by a period (.), or "dot". Also the source of a binding can be designated as the inherited data context, by simply preceding the property path with a dot (.). A value converter may optionally be specified as part of the SPath string by following the property path with a colon (:) and then a value converter reference.

In one embodiment a typecast may precede the binding source. If the typecast is present, the resultant value of the SimpleBinding markup extension is converted to the CLR type specified by the typecast. The SimpleBinding class uses an intelligent algorithm described in the Typecasting Feature section to perform this type conversion.

An SPath string must specify both a source and property path for the SimpleBinding extension. The typecast and value converter components are optional.

The Binding Source and the SPath String Syntax

In WPF, there are several ways to specify the source of a binding. The traditional WPF binding class provides three (3) properties for specifying an explicit source on the Binding object: the Source, the RelativeSource, and the ElementName property. In another embodiment, the source for a binding may be indicated by leaving all of the aforementioned explicit source properties unset. This creates an implicit binding source determined by the data context of the target DependencyObject.

In the SPath syntax, the binding source must always be specified. The SimplePath parser will dynamically determine whether the source represents an explicit source (Source, RelativeSource, or ElementName) or whether the binding should use the implicit (inherited) data context of the target object.

The examples shown in FIG. 2 (all of which designate both a source and property path) demonstrate several valid SPath strings and whether the source represents an explicit or implicit source.

SPath Delimiters

Delimiting an SPath string by square brackets causes the XAML parser to treat the SPath string as a mere string, rather than trying to parse it directly. This allows the SimplePath parser to handle the parsing of the SPath. Delimiting the SPath string also delineates the beginning and end of the SPath string.

Consider the following illustrative example of a SimpleBinding markup extension specified within markup:

```
<DataTrigger Binding="{im:SimpleBinding
   [{TemplatedParent}.IsMouseOver]}"
   Value="True" />
```

The above example illustrates the prototypical usage scenario for the SimpleBinding markup extension. Namely, an SPath string is passed to a SimpleBinding constructor. To be more precise, a single parameter is passed to the SimpleBinding constructor. WPF recognizes that the only single-parameter constructor for the SimpleBinding class requires a SimplePath object. Thus, WPF implicitly creates a SimplePath object using the supplied parameter. The SimplePath class also contains only one single-parameter constructor. This constructor expects an SPath string.

The SPath string, "[{TemplatedParent}.IsMouseOver]", is passed to the SimplePath constructor. The SimplePath parser, in turn, parses the SPath string and resolves it to the various SimpleBinding components, all stored within the SimplePath object. The SimplePath object is then passed to the SimpleBinding constructor which uses the resolved components to create the binding.

The square brackets are necessary because without them, the WPF parser would see the curly braces around TemplatedParent and attempt to resolve the string "{TemplatedParent}" on its own. Since there is no built-in WPF markup extension named TemplatedParent or TemplatedParentExtension, the parser would fail and throw a parser exception.

By enclosing the SPath within curly braces, the entire string is treated by WPF as a mere string. This allows the SimplePath class to handle all of the parsing on its own. To take it a step further, this actually requires the SimplePath class to handle all of the parsing. It cannot leverage the XAML parser's ability to resolve nested markup extensions. As such, the SimplePath parser must in many ways act as a full-fledged XAML parser.

The SPath string is also delimited with square brackets because of its potential usage within an EvalBinding extension. The EvalBinding extension is used to bind the value of a dependency property to dynamically changing property values of other CLR objects using a code expression. Details of the EvalBinding extension are described in co-pending patent application number {t.b.d.}, titled EvalBinding Extension, filed on concurrently with this application on Apr. 25, 2007, and U.S. provisional patent application No. 60/888,932 filed on Feb. 8, 2007, which are hereby incorporated by reference.

In markup, the code expression may be specified using multiple SPath strings. The square brackets serve as delimiters between the SPath strings and the code expression, as shown here:

```
<Ellipse Height="100" Fill="Blue" Stroke="White" StrokeThickness="1"
   Width="{im:EvalBinding
   [RootGrid.Background.Color.B]*[MySlider.Value]}" />
```

Because of the square brackets in the above example, the EvalBinding expression contains two SPath strings. These actually represent two SimpleBinding objects whose values are multiplied together.

Typecasting Feature

In one embodiment a typecast feature may be applied to a SimpleBinding extension by including a type reference within parentheses at the beginning of the SPath string. The type reference can be specified using a fully qualified CLR Type name, or by using any of the common CLR Type aliases used within the C# and VB.NET languages.

If a value converter is also specified as part of the SPath string, the specified CLR Type is passed to this value converter at the time of conversion. If a value converter is not specified, an attempt is made to convert the bound value using a default type converter. If no default type converter exists, a simple CLR typecast is used.

Parsing Routine

Illustrated in FIG. 3, is a process 300 for invoking a SimpleBinding extension. The exemplary process in FIG. 3 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 4, although it may be implemented in other system architectures.

The process begins by retrieving a markup or code declaration in block 302.

In block 302, a simple binding string (a.k.a., an SPath string) is retrieved from the SimpleBinding markup or code declaration. In block 306, the retrieved SPath string is parsed to create a parsed binding object. In this process, the SimplePath parser extracts the native binding components and SimpleBinding typecast. The binding components are then used to create a native WPF binding, the parsed binding object, which is applied to the target WPF dependency property. Once applied, this parsed binding object is evaluated by WPF to obtain a binding result.

Upon evaluation of the binding, a custom type conversion routine is used in block 314, to ensure that the binding result is of a type understood by the target WPF dependency property. This type conversion routine attempts to convert (during application runtime) the binding result to the desired type (as identified by the typecast member of the SimpleBinding or by properties of the target WPF dependency property) using a default type converter provided with the NET framework. If no default type converter exists, a simple CLR typecast is used to convert the value to the desired type.

In block 316 the final result is returned as the value of the target WPF dependency property.

Figure 4:
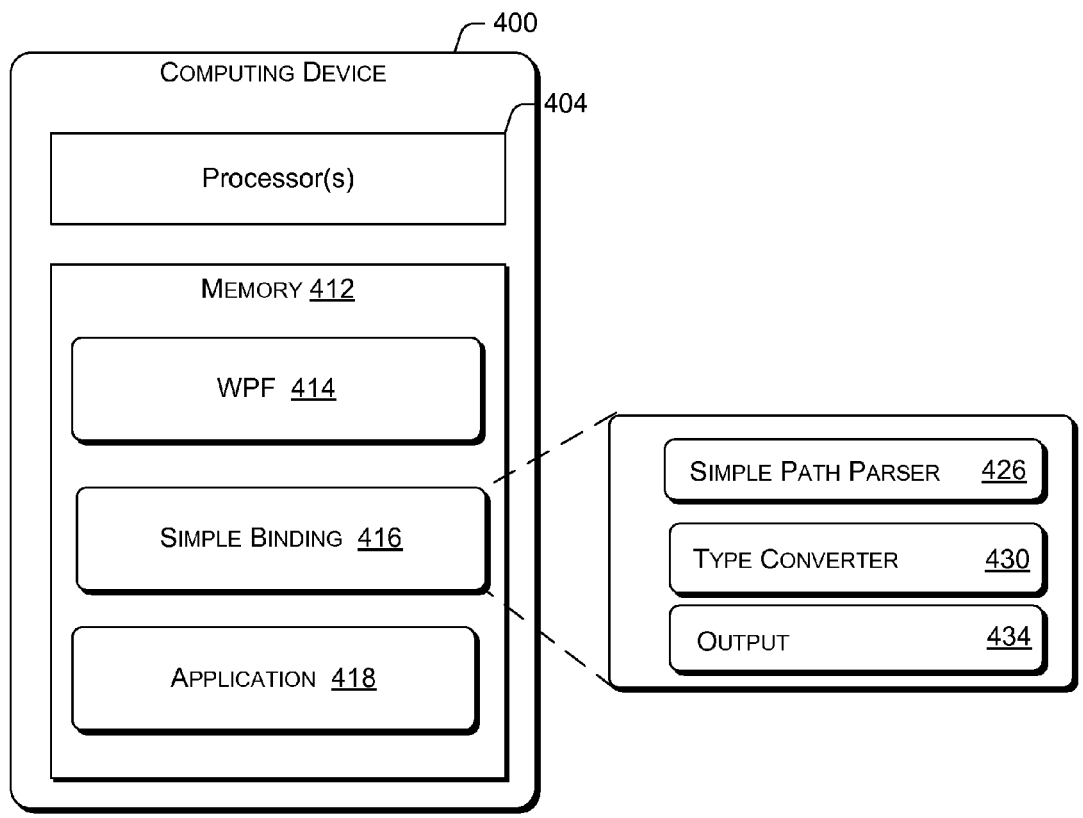
FIG. 4 is a block diagram depicting selected modules in a computer device that invokes the SimpleBinding markup extension.

In FIG. 4 are illustrated selected modules in computing device 400 using process 300 shown in FIG. 3. Computing device has process capabilities and memory suitable to store and execute computer-executable instructions. In one example, computing device 400 includes one or more processors 404 and memory 412.

The memory 412 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 412 of the computing device 400 is Windows Presentation Foundation 414 with an operating system (Such as a Window® Vista based operating system), a SimpleBinding extension 416 and a software/design application 418. SimpleBinding 416 includes SimplePath parser 426, type converter 430, and an output value 434.

The SimplePath parser 426 receives an SPath string and parses it to create the components for a native WPF binding. The binding is applied to a target WPF dependency property. Upon resolution of the binding, the type converter 430 attempts to convert the result to a CLR type that matches the desired type (as identified by the typecast member of the SimpleBinding).

The SimplePath parser 426 intelligently parses the SPath string and resolves all markup extension references of type StaticResource, ComponentResourceKey, RelativeSource, x:Static, x:Null, and x:Type (where "x:" represents the namespace mapping to the WPF XAML namespace). The SimplePath parser may dynamically determine whether the binding source represents an explicit source (Source, RelativeSource, or ElementName) or whether the binding should use the implicit (inherited) data context of the target object.

Once the SPath string has been resolved to its individual component parts, the SimpleBinding object is created.

The SimplePath parser operates using well-tested regular expressions that test against the aforementioned native WPF markup extensions. When any such native extension is encountered, it is resolved using the services provided by the IServiceProvider parameter of the ProvideValue override.

The SimplePath parser is able to use its intimate knowledge of the syntax of the SPath string to make accurate assumptions about abbreviated markup extensions. For instance, while interpreting a source reference, the SimplePath parser knows it can look for abbreviated forms of the RelativeSource members. This allows the SimplePath parser to accept the string "{Self}" as a simplified version of "{RelativeSource Self}".

Although an abbreviated markup extension is supported by the SimplePath parser, the full markup extension syntax is still always supported also. This means the SimpleBinding and SimplePath extensions should always work well in tool-driven scenarios.

As previously stated, the SimplePath parser is responsible for resolving all markup extension references within the SPath string. This provides the parser much more flexibility. This is the key to the "simple" aspect (the simplification concept) when using the SimpleBinding extension.

In one example, consider the following SimpleBinding declaration:

```
<ColumnDefinition x:Name="PersonasColumnDefinition"
   Width="{im:SimpleBinding[(GridLength){Self}.(md:AppWindow.-
PersonasColumnWidth)]}" />
```

To achieve this same binding using just the native WPF Binding class, the WPF binding would be as follows:

```
<ColumnDefinition x:Name="PersonasColumnDefinition"
   Width="{Binding RelativeSource={RelativeSource Self},
   Path=(md:AppWindow.PersonasColumnWidth),
   Converter={StaticResource DoubleToGridLengthConverter}}" />
```

Not only is the native WPF Binding class syntax more expansive and complex, but a custom Double to GridLength value converter would need to be implemented to perform conversion on the binding result. In the case of the SimpleBinding extension, this conversion on the binding result is achieved by applying a typecast feature (of type converter 430) of the SimpleBinding object.

The compact SPath syntax provides a simpler, more human-readable binding expression that is just as precise as the native WPF syntax. Furthermore, it lends itself nicely to usage within an evaluated expression (as in the EvalBinding Extension), whereas the native WPF syntax would be virtually unreadable as part of a code expression.

In another example, consider the following in which a Width property of a Rectangle is being bound using a SimpleBinding object: <Rectangle Width="{im:SimpleBinding [(int){TemplatedParent}.Width:Round]}"/>

In this example, there are four (4) parts to the SimpleBinding object:
   Source: The source is a template of the parent of the Rectangle element.
   Path: The path points to the Width property of the template of the parent.

Converter: A value converter is being specified with the name "Round".

Typecast: A typecast is being used to cast the result of the binding to an "int" value.

The SimpleBinding parser 426 will resolve this name by performing a resource lookup for a resource named "Round". The result of the binding will be converted using type converter 430 into the "int" value, where "int" is the C# alias for the CLR type System.Int32 of .Net framework type.

CONCLUSION

Although the extension has been described in language specific to structural features and/or methodological acts, it is to be understood that the extension defined in the appended claims is not necessarily limited to the specific features or acts described. Rather, the specific features and acts are disclosed as exemplary forms of implementing the claims.

What is claimed is:

1. A method comprising:
   establishing a binding for a presentation layer of an application framework using a compact binding syntax in which all binding components are specified in a Window Presentation Foundation (WPF) extensible application Markup language (SAML) simple binding string;
   parsing the syntax of the WPF XAML simple binding string to derive a binding class, wherein the simple binding string includes a typecast that indicates a type of a binding result to be obtained; and
   evaluating the binding class using a custom type conversion routine that ensures the type of the binding result is of a type understood by the target WPF dependency property, wherein the custom type conversion routine converts, during application runtime, the binding result to a desired type as identified by properties of the target WPF dependency property using a type converter provided with a windows .NET framework.

2. The method as recited in claim 1 wherein the presentation layer is windows presentation foundation (WPF), and wherein the binding class is a native WPF binding class.

3. The method as recited in claim 2 further comprising overriding a ProvideValue method when the native WPF binding class is derived to access XAML parser services.

4. The method as recited in claim 1 wherein the binding components are selected from a group of binding components comprising: a source, an inherited source, a relative source, an element name, a property path, a converter and a typecast.

5. The method as recited in claim 2 wherein the syntax of the binding components are parsed during WPF runtime.

6. The method of claim 1, wherein the simple binding string includes a typecast that indicates a type of a binding result to be obtained when a parsed syntax of the simple binding string is evaluated; and wherein deriving the binding class comprises converting the binding result during application runtime using the typecast into a type understood by a target presentation layer dependency property.

7. The method of claim 6, wherein the binding class type understood by the target presentation layer dependency property and specified by the type cast is a common language runtime (CLR) type.

8. The method of claim 6, wherein converting the binding result during application runtime comprises converting the binding result to the type understood by the target presentation layer dependency property using a default type converter provided with a NET framework.

9. The method of claim 1, wherein parsing the syntax of the simple binding string to derive a binding class comprises:
   using a separate markup extension class to parse the syntax of the simple binding string to derive the binding class.

10. A method for resolving a binding expression for use by an application invoking Windows Presentation Foundation (WPF), the method comprising:
    retrieving a markup or code declaration that includes a simple binding string;
    parsing the simple binding string into a parsed binding object;
    applying the parsed binding object to a target WPF dependency property such that the applied parsed binding object is evaluated by the WPF to obtain a binding result, wherein a type of the binding result to be obtained is indicated by a typecast within the simple binding string; and
    using a custom type conversion routine that ensures the type of the binding result is a type understood by the target WPF dependency property, wherein the custom type conversion routine converts, during application runtime, the binding result into a desired type as identified by properties of the target WPF dependency property using a default type converter provided with a NET framework.

11. The method as recited in claim 10 wherein the parsed binding object indicates a source and a path.

12. The method as recited in claim 10 wherein a type of the binding result is derived from properties of the target WPF dependency property.

13. A non-transitory computer readable medium comprising computer-executable instructions that, when executed by one or more processors, perform acts comprising:
    retrieving a declaration that includes a binding string, the binding string including a typecast;
    parsing the binding string into a parsed binding object;
    applying the parsed binding object to a target dependency property such that the applied parsed binding object is evaluated by a windows presentation foundation (WPF) to obtain a binding result;
    obtaining a type of the binding result that is indicated by the typecast included within the simple binding string; and
    using a custom type conversion routine that ensures the type of the binding result is a type understood by the target dependency property, wherein the custom type conversion routine converts, during application runtime, the binding result into a desired type as identified by properties of the target dependency property using a default type converter provided with a NET framework.

14. The non-transitory computer readable medium as recited in claim 13 wherein the binding string includes binding components, and wherein a type of the binding result is derived from properties of the target WPF dependency property.

* * * * *